United States Patent [19]

Brewster et al.

[11] Patent Number: 4,734,213
[45] Date of Patent: Mar. 29, 1988

[54] HAZE-FREE POLYMER ADDITIVES FOR FUELS AND LUBRICANTS

[75] Inventors: Phillip W. Brewster; Clinton R. Smith, both of Camlachie, Canada

[73] Assignee: Exxon Research & Engineering Co., Florham Park, N.J.

[21] Appl. No.: 51,529

[22] Filed: May 19, 1987

Related U.S. Application Data

[60] Division of Ser. No. 3,780, Jan. 16, 1987, which is a continuation of Ser. No. 709,680, Mar. 8, 1985, abandoned, which is a continuation of Ser. No. 278,179, Jun. 29, 1981, abandoned.

[51] Int. Cl.$^4$ .................................... C10M 145/00
[52] U.S. Cl. ................................................ 252/52 R
[58] Field of Search ...................................... 252/52 R

[56] References Cited

U.S. PATENT DOCUMENTS

| | | | |
|---|---|---|---|
| 3,793,351 | 2/1974 | McCoy | 252/51.5 A |
| 4,051,050 | 9/1977 | Elliott et al. | 252/50 |
| 4,089,794 | 5/1978 | Engel | 252/51.5 A |
| 4,092,255 | 5/1978 | Chapelet et al. | 252/50 |
| 4,113,636 | 9/1978 | Engel et al. | 252/51.5 A |
| 4,144,181 | 3/1979 | Elliott et al. | 252/33.4 |
| 4,146,489 | 3/1979 | Stambaugh et al. | 252/50 |
| 4,160,739 | 7/1979 | Stambaugh et al. | 252/34 |
| 4,161,462 | 7/1979 | Stambaugh et al. | 252/50 |
| 4,194,984 | 3/1980 | Elliott et al. | 252/50 |
| 4,507,420 | 3/1985 | Rosenberger | 252/52 R |
| 4,532,059 | 7/1985 | Rosenberger | 252/52 R |

*Primary Examiner*—William R. Dixon, Jr.
*Assistant Examiner*—Cynthia A. Prezlock
*Attorney, Agent, or Firm*—W. G. Muller

[57] ABSTRACT

Solutions of ethylene-propylene copolymers grafted with vinyl containing monomers, maleic anhydride or ethylenically unsaturated acids including functionalized derivatives thereof, reacted with polyols, polyamines and hydroxamines, as well as hydrogenated butadiene or isoprene copolymers, which solutions have haze-forming tendencies in mineral oil and are generally useful as multifunctional lubricating oil additives, are reduced in haze-forming tendencies by treatment with 0.5 to 25 wt. % of an alkyl hydroxy benzene compound, such as nonyl or dodecyl phenol.

3 Claims, No Drawings

HAZE-FREE POLYMER ADDITIVES FOR FUELS AND LUBRICANTS

This is a division of application Ser. No. 003,780 filed 1-16-87 which is a Rule 60 continuation of Ser. No. 709,680 filed 3-8-85 which is a Rule 60 continuation of Ser. No. 278,179 filed 6-29-81 both abandoned. This invention relates to haze-free multifunctional polymeric additives for lubricating oils which are useful both as dispersants and viscosity index improvers. More particularly, the invention relates to haze-free hydrocarbon mineral oil solution concentrates of ethylene alpha-olefin copolymers and terpolymers which have been solution grafted with polymerizable monomers and, in some cases, further derivatized by reaction with polyfunctional compounds containing amino or hydroxy functional groups.

Graft copolymers based on ethylene alpha-olefin which are either copolymerized or further functionalized with polyamines or polyols are known in the art and are disclosed in U.S. Pat. Nos. 4,089,794 issued May 16, 1978 to Engel et al; No. 4,146,489 issued March 27, 1979 to Stambaugh et al and U.S. Pat. No. 4,160,739 issued July 10, 1979 to Stambaugh et al. The tendency of such polymers to form haze in hydrocarbon or mineral oil solutions is also recognized in the art as described in U.S. Pat. No. 4,144,181 issued March 13, 1979 to Elliott et al which discloses haze-free hydrocarbon solutions of such multifunctional polymeric additives by reacting same with an oil soluble strong acid, preferably a long-chain alkyl aryl sulfonic acid.

The present invention is directed to a resolution of the same problem and provides an alternate technique for providing haze-free solutions through the use of certain aromatic hydroxy compounds.

In accordance with the present invention, there are provided substantially haze-free mineral hydrocarbon oil solution concentrate compositions comprising a hydrocarbon mineral oil of lubricating viscosity and from about 1 to 50 wt. %, based upon the total weight of said composition, of an ethylene alpha-olefin copolymeric dispersant-viscosity index improver material which, in solution, has haze-forming tendencies, which material has been formed by grafting ethylene alpha-olefin copolymers or terpolymers with (a) a vinyl containing nitrogen monomer; or (b) a monomer system comprising maleic anhydride and monomers copolymerizable therewith and postreacting the graft with a polyamine, or (c) an ethylenically unsaturated carboxylic acid material, which graft is subsequently reacted with polyamine, polyol or hydroxy amine, the elimination or inhibition of haze-forming tendencies being provided by treating said composition at temperatures of about 50° C. to 150° C. with about 0.5% to 25% by weight based on the weight of said solution of an oil-soluble alkyl hydroxy benzene compound, said compound containing 1-3 alkyl groups each containing about 2-20 carbon atoms and said compound having 1-3 hydroxy groups. A further embodiment of the present invention is lubricating oil compositions which contain the haze-free concentrates in amount of from about 1-30 wt. %, preferably 5 to 15 wt. %, based upon the total weight of said lubricating oil composition.

The treatment in accordance with the present invention to provide clear and haze-free oil solution concentrates is preferably conducted with about 2-8% by weight based on the weight of the solution of a monoalkylated phenol having 8-12 carbon atoms such as nonylphenol and dodecylphenol, which are particularly preferred materials. The treatment of the graft copolymers in accordance with the present invention is preferably conducted at a temperature of about 50°-90° C. for a period of about 10 minutes to 10 hours, preferably in the area of about 0.5 to about 3 hours.

While it is feasible to carry out the process of the present invention on a fully formulated oil as opposed to a solution concentrate, this is not a desirable approach since it could lead to unwanted interference with other additives present in such formulations.

The invention is particularly applicable to ethylene-propylene copolymers and ethylene-propylenediene terpolymers which are grafted with polar nitrogen-containing monomers such as C-vinyl pyridines and N-vinylpyrrolidone as described in said U.S. Pat. No. 4,146,489. The ethylene propylene polymers contain about 40-70 mole % ethylene, and have a viscosity average molecular weight of about 10,000 to 200,000. The terpolymers contain about 10% by weight of a non-conjugated diene such as 1,4 hexadiene, dicyclopentadiene or ethylidene norbornene. Examples of suitable polar, nitrogencontaining monomers which are grafted to these polymers or terpolymers are 2-vinylpyridine, N-vinylpyrrolidone, 4-vinylpyridine and other lower alkyl ($C_1$-$C_8$) substituted C-vinylpyridines such as 2-methyl-5-vinylpyridine, 2 methyl-4-vinylpyridine and 2 vinyl-6-methylpyridine. Such materials are preferably solution grafted in the presence of a free radical initiator such as alkyl peroxy esters, alkyl peroxides, alkyl hydroperoxides and the like with t-butyl perbenzoate as the preferred initiator. The temperature range is about 80°-150° C. and suitable solvent media include aliphatic or aromatic hydrocarbons including mineral oils, the latter being preferred since it provides a convenient vehicle for blending the finished product into a lubricating oil composition.

Another category of copolymers suitable for treatment in accordance with the present invention are those described in U.S. Pat. No. 4,144,181 which are the oil soluble derivatized ethylene copolymers based upon 2-98 weight % ethylene with one or more $C_3$-$C_{28}$ alpha olefins such as propylene which are grafted, preferably solution grafted, at elevated temperatures in the presence of a free radical initiator with an ethylenically-unsaturated carboxylic acid material thereafter reacted with a polyfunctional material reactive with carboxy groups such as a polyamine, a polyol or a hydroxy amine or mixture thereof to form carboxyl-grafted polymeric derivatives which are suitable as dispersant viscosity index improvers for lubricating oil. Ethylene copolymers preferably contain 30-80 weight % ethylene and 20-70 weight % of 1 or more alpha olefins, preferably $C_3$-$C_{18}$, particularly propylene, which will have a $M_n$ in the range of about 700-500,000, preferably 10,000-50,000 as determined by vapor phase osmometry. Ethylene-propylene copolymers are particularly preferred. Also suitable are ethylene alpha olefin terpolymers which additionally contain 0.5-20 preferably 1-7 mole % of a nonconjugated polyolefin such as cyclopentadiene, 2-methylene-5-norbornene, nonconjugated hexadiene or other nonconjugated diolefins having 6-15 carbon atoms such as ethyl norbornadiene, ethylidiene norbornene and the like, as well as mixtures of such nonconjugated diolefins.

The materials which are grafted onto the copolymers or terpolymers are those compounds which contain at least one ethylenic bond and at least one, preferably two, carboxylic acid or anhydride groups such as maleic anhydride, chloromaleic anhydride, itaconic anhydride, Nhexylmaleimide or the corresponding dicarboxylic acids such as maleic acid or fumaric acid. Also suitable are the monocarboxylic acrylics and methacrylics such as acrylic and, methacrylic acid, methyl acrylate and methyl methacrylate.

The grafting of the polymers conducted as described in U.S. Pat. No. 4,144,181 in the presence of a free radical initiator such as peroxide or hydroperoxide at elevated temperatures of about 100 to 250° C. and preferably in a mineral lubricating oil solution. Subsequent to the grafting, a derivatization reaction is carried out with a polyamine, polyol or hydroxyamine. Useful polyamines include those having 2-16 carbon atoms and about 2-6 nitrogen atoms in the molecule including the hydrocarbyl- polyamines which may contain other groups such as hydroxy, alkoxy, amide, imidazoline groups and the like. Preferred are the aliphatic saturated polyamines. Examples of suitable amine compounds include ethylene diamine, 1,2-diaminomethane, 1,3-diamino propane, triethylene tetramine, tetraethylene pentamine, 1,2-propylene diamine and the like. Other suitable amines include N-amino alkyl morpholines and N-amino alkyl piperazines.

A useful polyol for reaction with the grafted ethylene containing polymers are the $C_2-C_{30}$ polyols having 2-10 hydroxyl groups such as glycerol, alkylene glycols, such as dipropylene glycol, as well as pentaerythritol which is preferred polyol. The hydroxy amines include those having 2-30 carbon atoms, 1-6 hydroxy groups, and 1-10 nitrogen atoms such as diethanolamine, diisopropanolamine, tris-hydroxymethyl aminomethane, 2-amino-2-ethyl 1,3-propanediol and the like. The reaction with the grafted polymer preferably is conducted in solution at a temperature of 100°-250° C. utilizing 0.5-1.0 mole of the polyfunctional polyamine, polyol or hydroxy amine per mole of the grafted carboxylic material. The final product can then be subjected to the haze elimination treatment step in accordance with the present invention. Other graft copolymers which can have haze forming tendencies which can be treated in accordance with the present invention are the same ethylene alpha olefin, preferably propylene, copolymers or terpolymers which may be grafted with maleic acid or anhydride plus monomers copolymerizable with maleic acid or anhydride as described in detail in U.S. Pat. No. 4,160,739. Generally the monomers copolymerizable with maleic acid or anhydride are the alpha, beta-monoethylenically unsaturated monomers which are soluble in a reaction medium and suitably reactive, these include the esters, amides, and nitriles of acrylic and methacrylic acid and other monomers containing no free acid group. Other useful monomers include styrene, alpha-methyl styrene, $C_1-C_4$ alkyl and alkoxy ring substituted styrenes, $C_4-C_{12}$ alpha olefins such as isobutylene, vinyl esters such as vinyl acetate, vinyl ketone, vinyl chloride, and vinylidene chloride. Preferred are monomers containing up to about 10 carbon atoms as with the preparation of other copolymer based additives. As discussed above, the grafting is preferably conducted in solution at elevated temperatures of from about 80°-150° C. in the presence free radical initiator. After preparation of the graft copolymer, a post-reaction with a polyamine is conducted in the same solvent reaction medium at a temperature of at least about 80° C. and typically in the range of about 150°-250° C. A variety of polyamines are suitable including aliphatic, cycloaliphatic, aromatic or heterocyclic polyamines preferably containing a single primary or secondary amino group and at least one tertiary amino such as a heterocyclicamino group. The polyamines may contain up to about 6 nitrogen atoms, preferably 2-4 nitrogen atoms and, generally $C_4-C_{30}$, preferably $C_4-C_{12}$, polyamines are used.

Thickening efficiency (T.E.) is defined as the ratio of the weight percent of a polyisobutylene (sold as an oil solution by Exxon Chemical Company as Paratone N), having a Staudinger molecular weight of 20,000, required to thicken a solvent-extracted neutral mineral lubricating oil, having a viscosity of 150 SUS at 37.8° C., a viscosity index of 105 and an ASTM pour point of 0° F., (Solvent 150 Neutral) to a viscosity of 12.4 centistokes at 98.9° C., to the weight percent of a test copolymer required to thicken the same oil to the same viscosity at the same temperature. T.E. is related to $M_n$ and is a much more convenient, practical measurement. As a rough guide, a T.E. of 1.4 is about a $M_n$ of 17,000 while a T.E. of 2.86 is about a $M_n$ of 60,000; polymer type influences this relationship. Thickening efficiency is used in the examples below.

A wide range, e.g. 0.001 to 50 wt. %, of active ingredient polymeric additive of the oil-soluble graft polymer treated in accordance with this invention can be incorporated into about a major amount of an oleaginous material such as a lubricating oil or hydrocarbon fuel.

When used in lubricating oil compositions, e.g. automotive or diesel crankcase lubricating oil, the treated polymer solution concentrates are used preferably within the range of about 1 to 30 weight percent, preferably 5 to 15 wt. %, of polymer solution concentrate based on the weight of the total lubricating oil composition. The lubricating oils to which the products of this invention can be added include not only hydrocarbon oil derived from petroleum, but also include synthetic lubricating oils such as esters of dibasic acids and complex esters made by esterification of monobasic acids, polyglycols, dibasic acids and alcohols. Since these type of additives are normally sold and used as oil concentrates, the practical definition of use levels in terms of concentrates is used here.

These treated polymeric additives can be incorporated in fuels, such as middle distillate fuels, at active ingredient concentrations of from about 0.001% to about 0.5 wt. % and higher, preferably from about 0.005 to 0.2 wt. %, of the total composition. These treated polymeric additives can contribute dispersant activity to the fuel as well as varnish control behavior.

The nitrogen and/or oxygen containing graft polymers treated in accordance with the invention may be prepared in a concentrate form, e.g. from about 1 wt. % to about 50 wt. %, preferably 5 to 25 wt. %, in oil, e.g. mineral lubricating oil, for ease of handling.

In addition to treating the graft copolymers noted above, a further embodiment of the present invention resides in carrying out the treatment process of the present invention to clarify hazy solutions of hydrogenated copolymers of butadiene or isoprene with styrene. Solutions of these polymers, which are used as viscosity index improvers, do have a tendency to form hazy solutions at high concentrations, i.e. about 10% to 40% by volume and this haze can over a period of time give rise to deposition of sediment. Treatment of these hazy polymer solution concentrates with 0.75 to 25 wt. %, preferably 2-8 wt. %, of the alkyl hydroxy benzene compound, especially at elevated temperatures such as about 50° C., will provide clear stable solutions. The hydrogenated copolymers suitable for this embodiment are those copolymers of butadiene or isoprene with styrene, either random, tapered or block copolymers having a molecular weight of about 20,000 to 200,000 containing about 20 to 70 wt. % of copolymerized styrene and having viscosity index improving properties when used in lubricating oils. Such polymers are described for example in U.S. Pat. No. 3,965,019 and U.S. Pat. No. 4,081,390. Typically greater than 95% of the olefin bonds are hydrogenated. An example of such a polymer is a hydrogenated 25 wt. % styrene -75 wt. % isoprene copolymer having a $M_n$ of 50,000 -100,000 where the isoprene is greater than 95% of the 1,4 - form. Dodecyl and nonyl phenol are the preferred treating agents and substantially haze free lubricating oil compositions comprising a lubricating oil containing 0.1% to 50 wt. % of the copolymer treated in accordance with the invention.

The above solutions may contain other conventional additives, such as dyes, pour point depressants, antiwear agents, antioxidants, other viscosity-index improvers, dispersants and the like.

For purposes of this disclosure an oil-soluble compound should dissolve in mineral oil, e.g. Solvent 100 Neutral at 20° C. in a concentration of at least 5 weight percent based on the weight of said mineral oil.

The invention is further illustrated by the following Examples which are not to be considered limitative of its scope.

The Examples below will set forth both "concentrates" and "solutions". The term concentrates refers to the actual commercial form of the polymeric additives which are sold as mineral oil concentrated solutions containing a stated amount of polymeric additive. When actual finished lubricating oil formulations are prepared from these commercial additives, the "concentrate" is diluted to form a "solution". To fully evaluate the effect of treatment in accordance with the present invention, the treated concentrates are diluted to form solutions which reflect actual usage levels of additives in finished formulations. This is especially important in evaluating sediment formation since, while haze is usually observable in concentrates, sediment is not because of the high viscosity of the concentrate when compared with a diluted solution.

EXAMPLE 1

(A) A solution having a viscosity of 11 cSt at 100° C. was prepared which contained 14% by weight of a graft copolymer of ethylene-propylene (43 wt. % ethylene) copolymer with 2-vinyl pyridine available as "Acryloid 1155" from Rohm and Haas, Philadelphia, Pa. in the form of a mineral oil solution concentrate containing about 7-8% by weight of the vinyl pyridine grafted EP copolymer (% N=0.32; a T.E.=2.66) dissolved in Solvent 150 Neutral mineral lubricating oil. The solution of this concentrate was observed to be hazy and upon standing for 3 days, sediment deposits began to appear.

Viscosity of the 7-8 wt. % concentrate was 1562 cSt. at 100° C.

(B) A fresh sample of the above 7-8 wt. % concentrate was treated with 2 % by wt. of nonyl phenol based on the total weight of the concentrate at a temperature of 65° C. and provided a clear, easily flowing concentrate having a viscosity of 1164 cSt. at 100° C. A 14% by wt. oil solution of the thusly treated concentrate remained clear upon standing for two months with no observable sediment. The viscosity of this solution was 11 cSt at 100° C.

EXAMPLE 2

Example 1 was repeated using dodecyl phenol as the treating agent and equivalent results were obtained.

EXAMPLE 3

Example 1 was repeated using a solution of a concentrate of an ethylene-propylene copolymer (43% wt. % ethylene) having a T.E. of 2.7 grafted with maleic anhydride and post-reacted with tetraethylene pentamine following the method of U.S. Pat. No. 4,089,794. The solution was visibly hazy but treatment of the concentrate with 4% by wt. nonyl phenol at 65° C. yielded a clear solution with no haze or sediment formation upon standing. Viscosity for both the treated and untreated solutions was essentially the same.

EXAMPLE 4

A 20% mineral oil solution by volume of a concentrate containing about 3 wt. % of a 95% hydrogenated 25 wt. % styrene-75 wt. % isoprene copolymer having a $M_n$ of 50,000-100 000 in lubricating oil was measured for haze level using a nephelometer (Model 9, Coleman Industries, Maywood, Ill.) and the haze reading was 48 nephelos.

After treatment of the concentrate with 2% by wt. of nonyl phenol at 121° C. for 1 hour the haze level of a subsequently prepared 20% by volume solution of the concentrate was reduced to 14 nephelos. Thickening efficiency was not affected by the treatment with nonyl phenol.

What is claimed is:

1. A substantially free haze oil solution concentrate composition comprising a mineral hydrocarbon oil of lubricating viscosity and from about 0.1 to 50 wt. % based on the total weight of said composition of a viscosity index improving hydrogenated copolymer of butadiene or isoprene with 20 to 70 wt. % of copolymerized stryene, the copolymer having an $M_n$ of 20,000 to 200,000 wherein said composition has been treated at a temperature of about 50° C. to 150° C. with from about 0.75 to 25% by weight based on the weight of said concentrate with an oil soluble alkyl hydroxy benzene compound, said compound having 1 to 3 $C_2$-$C_{20}$ alkyl groups and 1-3 hydroxy groups.

2. The composition of claim 1 wherein said composition is treated with 2-8 wt. % of nonyl phenol or dodecyl phenol.

3. A lubricating oil composition containing 5 to 15 wt. % of the haze free solution concentrate of claims 1 or 2.

* * * * *